(12) United States Patent
Kaneko et al.

(10) Patent No.: US 9,105,383 B2
(45) Date of Patent: Aug. 11, 2015

(54) FERRITE PARTICLE AND PRODUCTION METHOD THEREOF

(75) Inventors: Yuji Kaneko, Nagoya (JP); Seishi Utsuno, Nagakute (JP)

(73) Assignee: KABUSHIKI KAISHA TOYOTA CHUO KENKYUSHO, Aichi-Gun (JP)

( * ) Notice: Subject to any disclaimer, the term of this patent is extended or adjusted under 35 U.S.C. 154(b) by 141 days.

(21) Appl. No.: 14/112,167

(22) PCT Filed: Mar. 27, 2012

(86) PCT No.: PCT/JP2012/002102
§ 371 (c)(1),
(2), (4) Date: Oct. 16, 2013

(87) PCT Pub. No.: WO2013/021521
PCT Pub. Date: Feb. 14, 2013

(65) Prior Publication Data
US 2014/0054491 A1    Feb. 27, 2014

(30) Foreign Application Priority Data
Aug. 9, 2011  (JP) .................. 2011-174032

(51) Int. Cl.
*C04B 35/26* (2006.01)
*H01F 1/10* (2006.01)
(Continued)

(52) U.S. Cl.
CPC ............ *H01F 1/01* (2013.01); *C01G 49/009* (2013.01); *C01G 49/0018* (2013.01); *C01G 49/0027* (2013.01); *C01G 49/0036* (2013.01);
(Continued)

(58) Field of Classification Search
CPC ....... C01G 49/009; H01F 1/0315; H01F 1/11; H01F 1/36
See application file for complete search history.

(56) References Cited

U.S. PATENT DOCUMENTS 5,866,028 A    2/1999  Toyota

FOREIGN PATENT DOCUMENTS

JP    A-2000-501893    2/2000
JP    A-2003-133119    5/2003
(Continued)

OTHER PUBLICATIONS

Jan. 6, 2015 Office Action issued in Japanese Application No. 2013-549444.
(Continued)

*Primary Examiner* — Carol M Koslow
(74) *Attorney, Agent, or Firm* — Oliff PLC

(57) ABSTRACT

A ferrite powder according to the present invention includes a laminar structure exhibiting a state where W-type ferrite phases are laminated in an easy direction of magnetization, the W-type ferrite phases including a compound expressed by $AM_2Fe_{16}O_{27}$, where A, M, Fe, and O represent a first metal element (Sr, Ba, Ca, Pb, etc), a second metal element (Fe, Zn, Cu, Co, Mn, Ni, etc), iron, and oxygen, respectively. This ferrite particle is obtained through: a shape forming step that shapes a mixed powder in a magnetic field to obtain a compact, the mixed powder including for example an M-type ferrite particle including a compound expressed by $AFe_{12}O_{19}$ and a spinel-type ferrite particle (S-type ferrite particle) including a compound expressed by $MFe_2O_4$; a calcination step that calcines the compact to obtain a calcined substance; and a milling step that mills the calcined substance.

10 Claims, 4 Drawing Sheets

ENLARGED VIEW OF SAMPLE NO. 1

(51) Int. Cl.
*H01F 1/01* (2006.01)
*C01G 49/00* (2006.01)
*H01F 1/03* (2006.01)
*C04B 35/626* (2006.01)
*H01F 1/11* (2006.01)
*H01F 1/36* (2006.01)

(52) U.S. Cl.
CPC ........ *C01G49/0063* (2013.01); *C01G 49/0072* (2013.01); *C04B 35/26* (2013.01); *C04B 35/2633* (2013.01); *C04B 35/62675* (2013.01); *C04B 35/62685* (2013.01); *H01F 1/0315* (2013.01); *H01F 1/11* (2013.01); *H01F 1/36* (2013.01); *C01P 2002/72* (2013.01); *C01P 2002/74* (2013.01); *C01P 2004/03* (2013.01); *C01P 2004/20* (2013.01); *C01P 2004/61* (2013.01); *C01P 2004/62* (2013.01); *C01P 2004/82* (2013.01); *C01P 2006/42* (2013.01); *C04B 2235/3213* (2013.01); *C04B 2235/3272* (2013.01); *C04B 2235/3274* (2013.01); *C04B 2235/3284* (2013.01); *C04B 2235/5236* (2013.01); *C04B 2235/5436* (2013.01); *C04B 2235/5445* (2013.01); *C04B 2235/605* (2013.01); *C04B 2235/763* (2013.01); *C04B 2235/80* (2013.01); *Y10T 428/2982* (2015.01)

(56) References Cited

FOREIGN PATENT DOCUMENTS

| JP | 2005-001950 | * | 1/2005 |
| JP | A-2005-001950 | | 1/2005 |
| JP | 2006-135238 | * | 5/2006 |
| JP | A-2006-135238 | | 5/2006 |
| JP | A-2007-031204 | | 2/2007 |
| WO | WO 2005/056493 A1 | | 6/2005 |

OTHER PUBLICATIONS

Liu et al., "Fabrication of Ba-Hexaferrite Quasi-single Crystals and their Magnetic Properties," *Journal of Inorganic Materials*, May 2009, pp. 599-601, vol. 24, No. 3 (with abstract).

Office Action issued in Chinese Patent Application No. 201280030588.4 dated Aug. 14, 2014 (with translation).

Written Opinion of the International Searching Authority Issued in Application No. PCT/JP2012/002102; Dated Jun. 4, 2012.

International Search Report issued in Application No. PCT/JP2012/002102; Dated Jun. 4, 2012.

* cited by examiner

SAMPLE No. 1

ENLARGED VIEW OF SAMPLE NO. 1

SAMPLE No. C1

SAMPLE No. 1

SAMPLE No. C1

SAMPLE NO. 1 BEFORE CALCINING

FERRITE PARTICLE AND PRODUCTION METHOD THEREOF

TECHNICAL FIELD

The present invention relates to a ferrite particle capable of exhibiting high magnetic characteristics caused by highly orientated W-type ferrite phase as a main phase and also relates to a production method for the same.

BACKGROUND ART

Magnets using relatively inexpensive ferrite (iron-base oxide) (i.e. ferrite magnets) have heretofore been utilized for various products in different fields. In recent years, ferrite magnets requiring no rare metal, such as rare earth magnets, come to the front from the view point of resources aspect.

Ferrite as a magnetic material, which is the collective term for ceramics containing iron oxide ($Fe_2O_3$) as main component, falls into the general classification of a cubic system, such as spinel-type ferrite (referred to as "S-type ferrite" hereinafter) used for a soft magnet, and a hexagonal system, such as M-type ferrite used for a hard magnet (permanent magnet). Among them, notable one is the latter hexagonal ferrite to be a hard magnet.

Hexagonal ferrite comprises $AO-M^{2+}O-Fe_2O_3$ (A: Ba, Sr, etc/M: Zn, Cu, etc), and there may exist plural types, such as M-type, W-type, X-type, Y-type, and Z-type, in accordance with the combination of specific metal elements. Actually focused ones as materials for permanent magnets are, however, only the M-type ferrite and the W-type ferrite. Particularly, almost all ferrite magnets utilized at the moment are the M-type ferrites, such as $SrO \cdot 6Fe_2O_3$ and $BaO \cdot 6Fe_2O_3$. In contrast, the W-type ferrite has scarcely ever been put to practical use.

However, the W-type ferrite has higher saturation magnetization than that of the M-type ferrite. Accordingly, if allowed for taking advantage of W-type ferrite, a ferrite permanent magnet with higher magnetic characteristics than conventional ones would be obtained. From such viewpoints, various proposals for W-type ferrite and magnets employing the same have been made, which include the descriptions relevant to the following patent literatures, for example.

CITATION LIST

Patent Literature

PTL 1: Japanese Translation of PCT International Application Publication No. 2000-501893 (WO 97/35815)
PTL 2: WO 2005/056493
PTL 3: Japanese Unexamined Patent Application Publication No. 2005-1950
PTL 4: Japanese Unexamined Patent Application Publication No. 2006-135238
PTL 5: Japanese Unexamined Patent Application Publication No. 2007-31204

SUMMARY OF INVENTION

Technical Problem

In particular, PTL (Patent Literature) 3 and PTL 4 describe that magnetic powder containing W-type ferrite is obtained through shape forming, sintering (calcining), and milling for mixed powder of S-type ferrite powder containing lithium (Li) and M-type ferrite powder. However, the W-type ferrite phase in the particle obtained in such a manner is such that the crystals are isotropic and the crystalline orientation (or magneto crystalline anisotropy) in the easy direction (c-axis) of magnetization is low. Consequently, even if such magnetic powder described in PTL 3 or PTL 4 is used, it may be considered difficult to obtain a ferrite magnet with high magnetic characteristics.

The present invention has been created in view of such circumstances, and objects of the present invention include providing a ferrite particle of high magnetic characteristics having W-type ferrite phase as a main phase and also providing a production method for the same.

Solution to Problem

As a result of intensive studies to solve such problems and repeating trial and error, the present inventors have newly found out that stable ferrite particles are obtained in which W-type ferrite phases are highly orientated, by shape forming mixed powder of S-type ferrite powder and M-type ferrite powder in a magnetic field into a compact and calcining and milling the compact. Developing this achievement, the present invention has been accomplished as will be described hereinafter.

<<Ferrite Particle>>

(1) The ferrite particle according to the present invention is characterized by comprising a laminar structure exhibiting a state where W-type ferrite phases are laminated in an easy direction of magnetization, wherein the W-type ferrite phases comprise a compound expressed by $AM_2Fe_{16}O_{27}$, where A, M, Fe, and O represent a first metal element, a second metal element, iron, and oxygen, respectively.

(2) First of all, the ferrite particle according to the present invention consists primarily of the W-type ferrite phases thereby to have higher saturation magnetization than that of conventional M-type ferrite particle. And then it is considered that those W-type ferrite phases come to be such a state as being laminated in the easy direction (c-axis) of magnetization and the ferrite particle according to the present invention thus develops a high magneto crystalline anisotropy (crystalline orientation) as well. Therefore, by using the ferrite particle according to the present invention of highly saturation magnetization and with high degree of orientation (high degree of magneto crystalline anisotropy), a ferrite permanent magnet is obtained which is significantly excellent in high magnetic characteristics compared to the conventional ones.

(3) It should be appreciated that the present invention is to be understood by definition not only as a ferrite particle but also as being ferrite (magnetic) powder, particles, grains, or other aggregations.

<<Production Method for Ferrite Particle>>

The above-described ferrite particle according to the present invention can be obtained by, such as, but not limited to, a production method according to the present invention as follows.

(1) That is, the production method for a ferrite particle according to the present invention is characterized by comprising: a shape forming step that shapes a mixed powder in a magnetic field to obtain a compact, wherein the mixed powder comprises M-type ferrite particles comprising a compound expressed by $AFe_{12}Fe_{19}$ and spinel-type ferrite particles (referred to as "S-type ferrite particles" hereinafter) comprising a compound expressed by $MFe_2O_4$; a calcination step that calcines the compact to obtain a calcined substance; and a milling step that mills the calcined substance.

(2) In the production method for a ferrite particle according to the present invention, different from the conventional production method, the mixed powder of M-type ferrite particles and S-type ferrite particles is used and this mixed powder is shaped in a magnetic field. The obtained compact in this manner undergoes baking (calcining) and milling (including fracturing, crushing, etc) thereby allowing the above-described ferrite particle of highly saturation magnetization and with high degree of orientation (high degree of magneto crystalline anisotropy) to be efficiently and stably obtained.

Besides, both the M-type ferrite particles and the S-type ferrite particles are commercially available at low cost. Therefore, according to the production method of the present invention, a ferrite particle of highly saturation magnetization and with high degree of orientation can be produced at low cost and without any difficulty.

The reason that the production method according to the present invention allows for obtaining excellent ferrite particle (powder as well) is, however, not necessarily sure. It may be considered at present as follows. First, W-type ferrite ($AM_2Fe_{16}O_{27}/AO2MO$ $8Fe_2O_3$) takes a crystal structure which contains more S-type ferrite ($MFe_2O_4/MOFe_2O_3$) than M-type ferrite ($AFe_{12}O_{19}/AO6Fe_2O_3$). For this reason, W-type ferrite has typically been formed as a mixed phase state with S-type ferrite because difficult to be formed as a single phase. In addition, only an isotropic ferrite particle may have generally been obtained when synthesizing W-type ferrite using raw materials, such as SrO, ZnO, and $Fe_2O_3$.

In contrast, if the mixed powder of M-type ferrite particles and S-type ferrite particles is shaped in a magnetic field according to the production method of the present invention, then a compact is obtained in which the S-type ferrite particles reside around the orientated M-type ferrite particles. This compact is heated at an appropriate temperature (subjected to calcining), so that the M-type ferrite particles and the S-type ferrite particles react with each other (solid-phase reaction, two-stage reaction, etc) to synthesize W-type ferrite phases while maintaining the orientation of the magnetization easy axes in the M-type ferrite particles.

It is thus considered that, although the M-type ferrite particles disappear or lose substances during that synthesis, the orientation of W-type ferrite phases (lamination in the easy direction of magnetization) would be facilitated or induced because the M-type ferrite particles have preliminarily been orientated before that synthesis. As a result, such a ferrite particle is considered to be obtained that comprises a structure where considerably thin W-type ferrite phases (e.g. W-type ferrite phases with thickness of several tens nm to hundreds nm) are laminated in the orientation direction (the easy direction of magnetization of M-type ferrite particles) caused during the shaping in the magnetic field.

Note that appropriately adjusting the compounding ratio between the M-type ferrite particles and the S-type ferrite particles allows for obtaining a ferrite particle of W-type ferrite single phase, a ferrite particle comprising a mixed-phase structure of W-type ferrite phase and S-type ferrite phase (WS mixed-phase structure), or a ferrite particle comprising a mixed-phase structure of W-type ferrite phase and M-type ferrite phase (WM mixed-phase structure).

<<Others>>

(1) The ferrite particle according to the present invention may arbitrarily contain one or more "modifying elements" which are effective for improving the characteristics thereof. While the characteristics to be improved and the type of the modifying elements are not particularly limited, the contained amount thereof is usually extremely small. Examples of such modifying elements or modifying compounds include substances, such as $SiO_2$ (grain growth inhibitor), CaO (sintering accelerator), $Al_2O_3$, and $Cr_2O_3$, which contain elements to be easily substituted for Fe.

Of course, the ferrite particle according to the present invention may contain inevitable impurities, such as impurities having been contained in the raw material powder and impurities to be mixed or the like during each process, which are difficult to be removed for the reason of cost, technical reason, or other reasons.

(2) When there is no particular explanation, a numerical range "x to y" as used herein includes the lower limit value x and the upper limit value y. Using various numerical values or any numerical values included in numerical ranges described herein as a new lower limit value or upper limit value, a newly-created numerical range such as "a to b" may be possible.

DESCRIPTION OF EMBODIMENTS

Figure 1A:
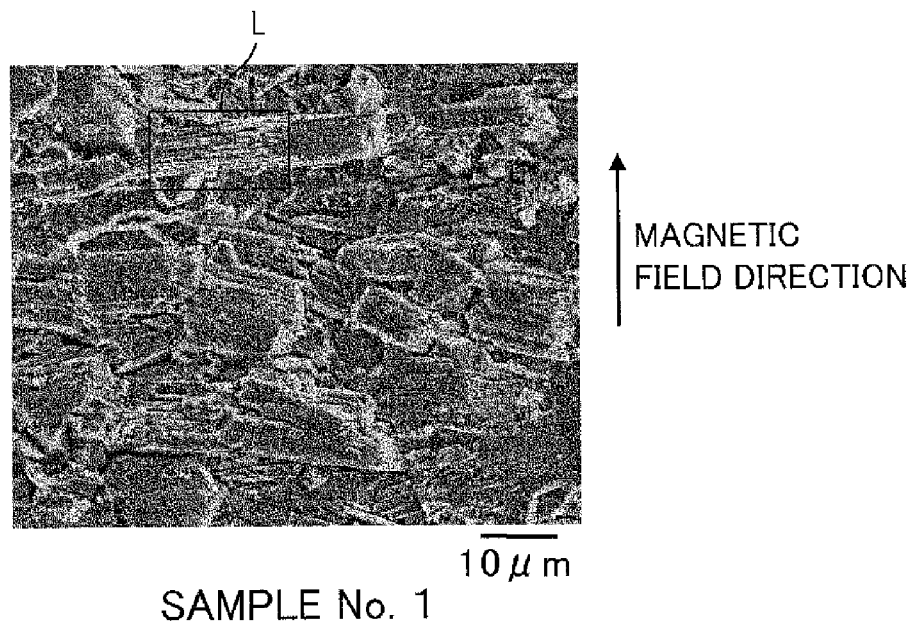
FIG. 1A is a SEM photograph of a ferrite particle involved in Sample No. 1.

The contents described herein may be applicable to a ferrite particle (including ferrite powder) according to the present invention as well as a production method for the same. Entities regarding the production method, when understood as a product-by-process, may also be entities regarding a product. Further, one or more constituent elements arbitrarily selected from the present description may be added to as one or more constituent elements of the above-described present invention. Whether or not either embodiment is the best is different according to objectives, required properties, and other factors.

<<Ferrite Particle>>

(1) Metallographic Structure

The ferrite particle according to the present invention is not necessarily required to be a W-type ferrite single phase so long as containing W-type ferrite phase as the main phase. Coexistence with spinel-type ferrite phase (S-type ferrite phase) or M-type ferrite phase allows for adjusting the magnetic characteristics of the ferrite particle and reducing the cost in producing, etc. Therefore, the ferrite particle according to the present invention may be, as previously described, a ferrite particle having the WS mixed-phase structure in which W-type ferrite phase and S-type ferrite phase are mixed, or a ferrite particle having the WM mixed-phase structure in which W-type ferrite phase and M-type ferrite phase are mixed.

Here, considering the ferrite particle according to the present invention as a material for hard magnet, it is preferred to reduce the content percentage of S-type ferrite as a material for common soft magnet in order to improve the degree of crystalline orientation and magnetic coercive force thereof. For example, it is preferred that the S-type ferrite percentage in the above WS mixed-phase structure is 6% or less, 5% or less, 3% or less, and further preferably 1% or less, where the S-type ferrite percentage is an existence fraction of the S-type ferrite phase, which is determined by peak intensity ratios calculated on the basis of X-ray diffraction patterns (2theta=20 degrees to 70 degrees) using a Cu tube as an X-ray source. Note that details for the peak intensity ratios will be described later.

On the other hand, the M-type ferrite, although used in general for a material for hard magnetic, has a lower saturation magnetization than that of the W-type ferrite. Consequently, it is also preferred to reduce the content percentage in the ferrite particle according to the present invention. For example, it is preferred that the M-type ferrite percentage in the above WM mixed-phase structure is 20% or less, 15% or less, 10% or less, 5% or less, 3% or less, and further preferably 1% or less, where the M-type ferrite percentage is an existence fraction of the M-type ferrite phase, which is determined by peak intensity ratios calculated on the basis of X-ray diffraction patterns (2theta=20 degrees to 70 degrees) using a Cu tube as an X-ray source.

The ferrite particle according to the present invention has a laminar structure such as where layered W-type ferrite phases are laminated in the easy direction (c-axis) of magnetization. When observing the ferrite particle from the direction perpendicular to the lamination direction thereof, that laminar structure may be observed with the entire surface of the outer appearance of the ferrite particle, or observed with the internal of the ferrite particle. For example, if the ferrite particle is a W-type ferrite single phase, then the laminar structure may appear on the surface of the outer appearance. If, however, M-type ferrite particles or S-type ferrite particles are used as the raw material for synthesizing the W-type ferrite phase, then outer appearance surfaces may be observed which are caused by the M-type ferrite particles or S-type ferrite particles remaining (losing its substances) on the outer surfaces. Therefore, the laminar structure of the ferrite particle according to the present invention is enough if being a fracture surface structure to be at least observed at a fracture surface (plane including the t-axis).

(2) Crystalline Structure

The laminar structure such as where W-type ferrite phases are laminated in the easy direction of magnetization is also supported by the following results of X-ray diffraction (XRD) analysis for ferrite particles according to the present invention. That is, when the ferrite particles according to the present invention are measured using a Cu tube as an X-ray source, an X-ray diffraction pattern is obtained for the W-type ferrite phase, where diffraction lines from (00L) plane are steadily observed within the range of full width at half maximum 2theta=20 degrees to 70 degrees. In addition, the diffraction line intensity from (0010) plane strongly appears compared to the diffraction line intensity from (116) plane.

(3) Composition

W-type ferrite constituting the main phase of the ferrite particle according to the present invention consists essentially of a compound expressed by $AM_2Fe_{16}O_{27}$, and S-type ferrite and M-type ferrite to be raw materials thereof consist essentially of a compound expressed by $MFe_2O_4$ and a compound expressed by $AFe_{12}O_{19}$, respectively.

Here, the types of first metal element (A) and second metal element (M) are not particularly limited if they represent elements constituting hexagonal ferrite or cubic ferrite. Each of these elements may be of one or more types. Among them, the first metal element (A) is preferred to be an element of which the ion radius is similar to that of $O^{2-}$ and which forms its ion capable of substituting for $O^{2-}$ in the ferrite crystal (hexagonal crystal). For example, the first metal element (A) is preferred to be at least either one of strontium (Sr), barium (Ba), calcium (Ca), or lead (Pb).

The second metal element is in general an element to form its bivalent metal ion ($M^{2+}$), and considering the magnetic characteristics of the ferrite particle it is preferred that the second metal element is a transition metal element, particularly iron group (Group 8 to Group 10) element or other neighboring transition metal element. For example, the second metal element (M) is preferred to be at least either one of Fe, zinc (Zn), copper (Cu), cobalt (Co), manganese (Mn), or nickel (Ni). Alternatively, the second metal element (M) may also be lithium (Li), magnesium (Mg), or other appropriate element.

<<Production Method for Ferrite Particle>>

(1) Raw Material Powder

In the production method according to the present invention, the raw material powder is prepared first as a mixed powder comprising M-type ferrite particles and S-type ferrite particles. M-type ferrite powder and S-type ferrite powder are commercially and easily available at relatively low cost with few resource problems. Note that M-type ferrite particles (powder) with enhanced magneto crystalline anisotropy are preferably used in order for the raw material powder to be highly orientated in the shape forming step.

In the case of synthesizing W-type ferrite from M-type ferrite particles and S-type ferrite particles, the theory gives the ratio thereof as: (M-type ferrite particles)/(S-type ferrite particles)=½ (molar ratio). The magnetic characteristics (e.g. magneto crystalline anisotropy) of the obtained ferrite particles, however, tend to be more enhanced when M-type ferrite remains than if S-type ferrite would remain. Accordingly, the fraction of S-type ferrite particles to M-type ferrite particles is preferred to be two or less. More correctly to say, the mixed powder is preferred such that the S-type ferrite compounding ratio defined as a ratio of the number of moles of $MFe_2O_4$ to that of $AFe_{12}O_{19}$ is two or less, and further preferably 1.8 or less. Note that the lower limit value of the S-type ferrite compounding ratio is preferred to be one or more, and further preferably 1.2 or more.

As a result of intensive studies by the present inventors, the preferred range of the above-described S-type ferrite compounding ratio is 1.4 to 1.8 and further preferably 1.5 to 1.7 because such ranges allow for obtaining ferrite particles comprising W-type ferrite single phases or nearly equivalent structures thereto. If the ratio is unduly small, then M-type ferrite phases increase, whereas if the ratio is unduly large, then S-type ferrite phases increase, therefore both being undesirable.

Particle diameter of each particle in the mixed powder is not particularly limited. It is preferred, however, that the average particle diameter of M-type ferrite particles is one micrometer or less in view of achieving a high coercive force. In addition, considering the enhancement in reactivity of W-type ferrite, it is preferred that the average particle diameter of S-type ferrite particles is 0.5 to 3 micrometers, and further preferably one micrometer or less. Note that the average particle diameter is a value determined by using a scanning electron microscope (SEM).

(2) Shape Forming Step

A compact is obtained by shaping the above-described mixed powder in a magnetic field. The magnetic field to be applied has an appropriate intensity, such as, but not limited to, 1 to 3 T (tesla), which is preferred in view of causing M-type ferrite particles to be sufficiently orientated.

The compact may not necessarily be a compressed compact if M-type ferrite particles and S-type ferrite particles are adjacent to each other with such an extent that W-type ferrite is synthesized and if the compact has a shape retaining property enough to be handled. In the case of performing such a compression shape forming, the compressing pressure is sufficient if it is approximately 5 to 50 MPa. While the ambient where the shape forming in magnetic field is performed is not particularly limited, it is enough if being in ambient atmosphere.

(3) Calcination Step

By calcining the compact having been shaped in a magnetic field, M-type ferrite particles and S-type ferrite particles in the compact react to generate W-type ferrite phases. The calcining temperature at this time is preferred to be 1,200 to 1,400 degrees C., and further preferably 1,250 to 1,350 degrees C. The calcining time at this time is preferred to be more or less 0.5 to 3 hours. The calcining ambient of atmospheric pressure may be possible if the second metal element (M) is Zn, Ni, Co, Mg, etc, but the calcining ambient when the second metal element (M) is Fe is preferred to be an oxidation resistant ambient.

(4) Milling Step

By milling the calcined substance having been obtained in the calcination step, ferrite particles according to the present invention are obtained which have laminar structures of W-type ferrite phases. The milling step is preferred to be such that, for example, the calcined substance are first coarsely milled into grains of about several mm using a rod will etc, and the grains are then finely milled into particles with a desirable particle diameter using a ball mill etc. Note that, if utilized as raw material powder for a ferrite magnet, the average particle diameter of the ferrite particles is preferred to be 1 to 50 micrometers, and further preferably 5 to 20 micrometers. Note also that the average particle diameter is determined from several average particle diameters which are obtained as 50% accumulated values of particle diameters measured by laser diffractometry.

<<Applications>>

While the intended use is not particularly limited, the ferrite particles according to the present invention are used in general as component powder for a ferrite magnet which is a permanent magnet. Note that the ferrite magnet may be a sintered magnet or a bond magnet. Ferrite magnets are utilized for various products (such as various kinds of motors and solenoids) in different fields. By using ferrite magnets comprising the ferrite particles according to the present invention, magnetic characteristics are enhanced thereby to significantly improve downsizing and weight saving of products compared to conventional techniques.

Examples

The present invention will be more specifically described with reference to examples.

<<Production of Samples>>

(1) Raw Materials

Commercially available M-type ferrite powder (SrO 6Fe$_2$O$_3$/SRF12PB available from Kojundo Chemical Lab. Co., Ltd.) and as-prepared spinel-type ferrite powder (ZnO Fe$_2$O$_3$) were prepared as raw powder materials. Note that the spinel-type ferrite powder was prepared through weighing alpha-Fe$_2$O$_3$ powder (FEO10PB available from Kojundo Chemical Lab. Co., Ltd.) and ZnO powder (ZNO02PB available from Kojundo Chemical Lab. Co., Ltd.) with molar ratio of 1:1, mixing them during 24 hours to obtain a mixed powder, and heating the mixed powder at 1,300 degrees C. during 4 hours in ambient atmosphere.

(2) Mixing

These raw powder materials were mixed to be of each compounding molar ratio as shown in Table 1 (mixing step). The compounding molar ratio according to the present examples is a ratio of the number of moles of ZnO Fe$_2$O$_3$ (ZnFe$_2$O$_4$) to the number of moles of SrO 6Fe$_2$O$_3$ (SrFe$_{12}$O$_{19}$) (that is, ZnFe$_2$O$_4$/SrFe$_{12}$O$_{19}$). This compounding molar ratio represents the S-type ferrite compounding ratio referred in the present invention. Note that the mixing of the powder materials was performed during 4 hours using a ball mill.

(3) Shape Forming

Obtained each mixed powder was put into a cavity to fill it, and compressed to perform compression shape forming with pressure of 10 MPa while being applied with magnetic field of 2 T (shape forming step). A compact of 15 mm×10 mm×10 mm was thus obtained. Note that the mixing and the shape forming were performed at room temperature in ambient atmosphere.

(4) Calcining

That compact was located in a furnace of inert gas (nitrogen) ambient and heated at 1,300 degrees C. during one hour (calcination step). A calcine (calcined substance) was thus obtained for each sample.

(5) Milling

That calcine was crushed/milled using an iron mortar. The obtained milled particles were given as each sample. Note that those milled particles represent the ferrite particle(s) (magnetic particle(s)) referred in the present invention, and collective or aggregation thereof is to be the ferrite powder (magnetic powder).

(6) Comparative Samples

A sample was similarly prepared but without applying any magnetic field and thus formed with non-orientation state (Sample No. C1). In addition, M-type ferrite powder in itself was prepared as a standard sample for saturation magnetization (Sample No. C2).

<<Observation and Measurement for Samples>>

(1) Observation of Fracture Surface

Figure 1B:
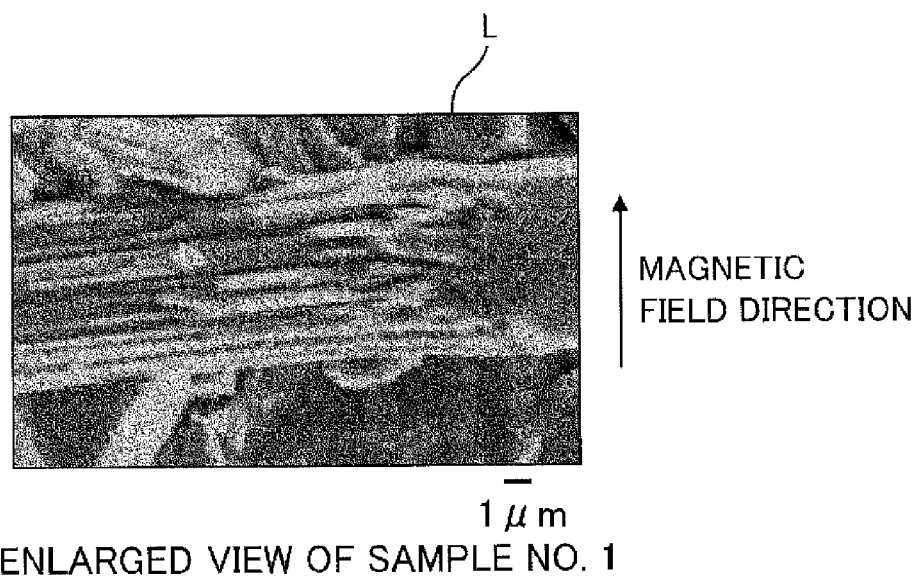
FIG. 1B is an enlarged photograph of area L in the SEM photograph of FIG. 1A.
Figure 2:
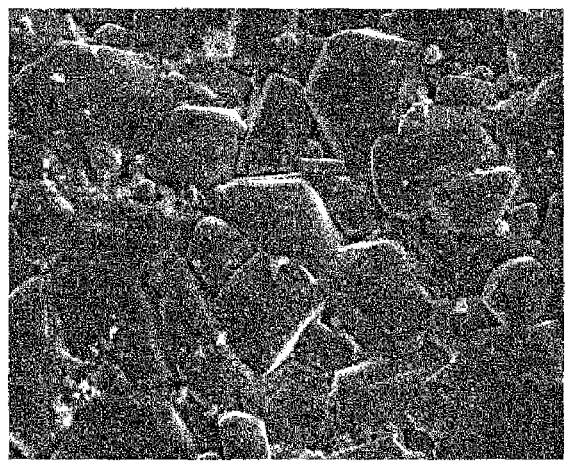
FIG. 2 is a SEM photograph of a ferrite particle involved in Sample No. C1.

The surface of the milled particle (ferrite particle) appeared at the time of milling each calcine was observed using a scanning electron microscope (SEM). These appearances are shown in FIG. 1A, FIG. 1B, and FIG. 2. FIG. 1A is a SEM image of Sample No. 1, and FIG. 1B is an enlarged image thereof. FIG. 2 is a SEM image of Sample No. C1.

(2) Identification of Compound Phase

Figure 3A:
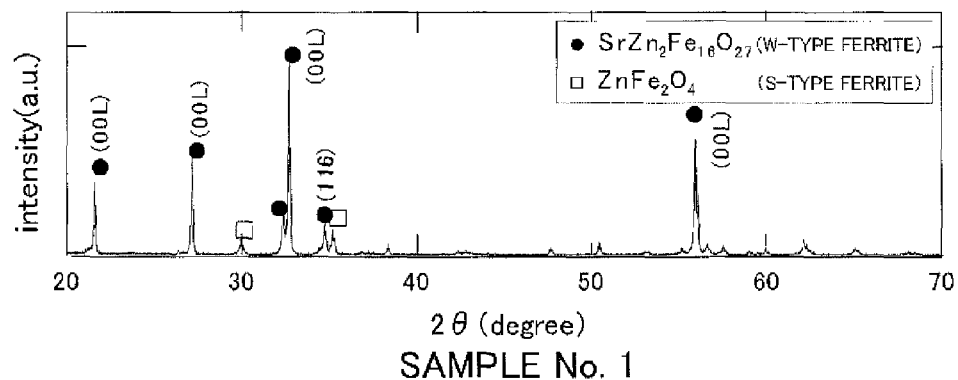
FIG. 3A is an X-ray diffraction pattern for ferrite particles involved in Sample No. 1.
Figure 3B:
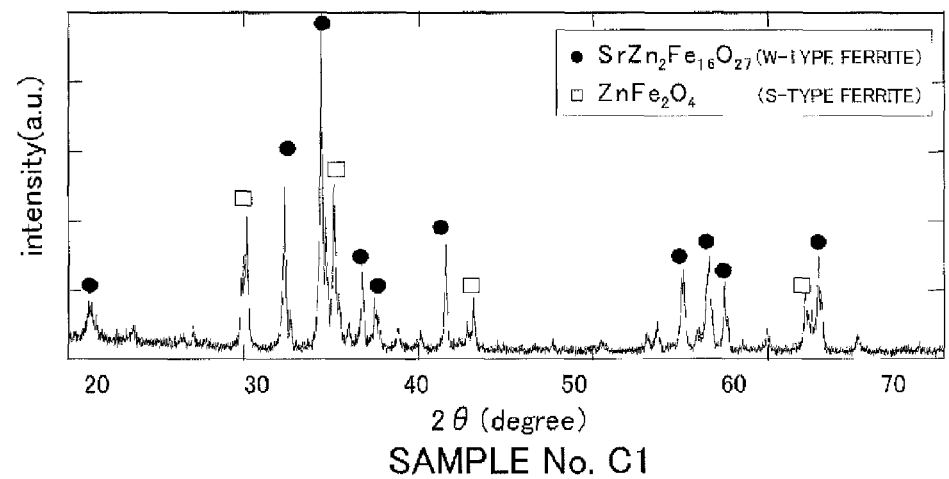
FIG. 3B is an X-ray diffraction pattern for ferrite particles involved in Sample No. C1.
Figure 3C:
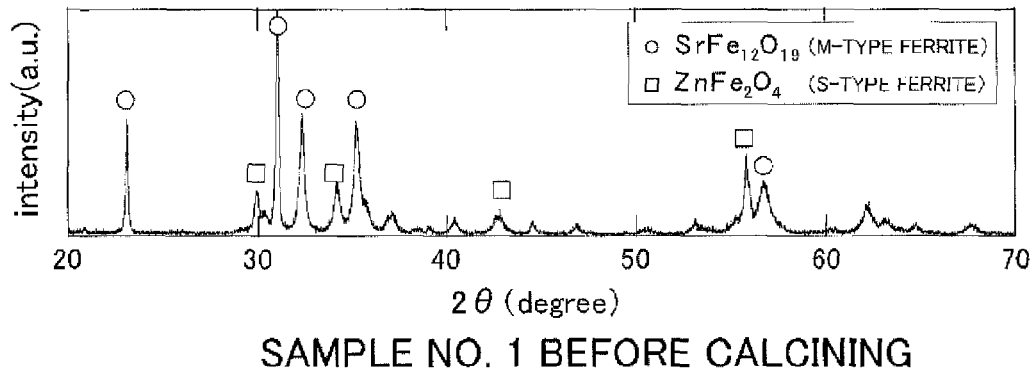
FIG. 3C is an X-ray diffraction pattern for particles before calcining involved in Sample No. 1.
Figure 4:
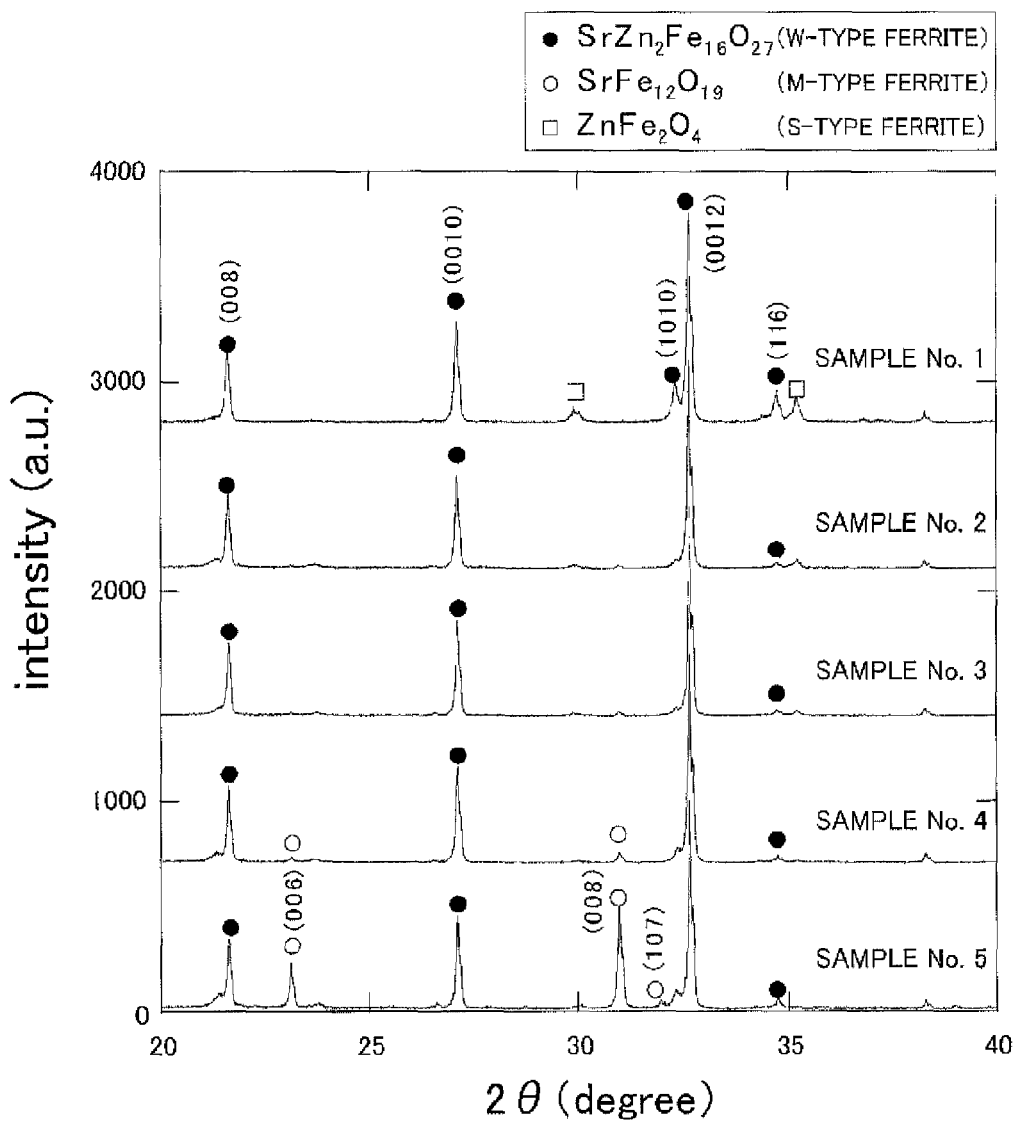
FIG. 4 is a diagram comparing X-ray diffraction patterns for ferrite particles involved in Samples No. 1 to No. 5.

X-ray diffraction (XRD) analysis was performed for the milled particles of each sample using a Cu tube as the X-ray source. Respective examples of X-ray diffraction patterns obtained for the samples are shown in FIGS. 3A to 3C (which may be referred collectively to as FIG. 3). FIG. 3A and FIG. 3B depict X-ray diffraction patterns for Sample No. 1 and Sample No. C1, respectively, and FIG. 3C depicts an X-ray diffraction pattern for milled particles of a compact before calcining involved in Sample No. 1. Further, FIG. 4 represents X-ray diffraction patterns (2theta=20 to 40) obtained for milled particles of Samples No. 1 to No. 5.

Fractions of M-type ferrite phase and spinel-type ferrite (S-type ferrite) phase existing in the compound phase of each sample were obtained from a peak intensity ratio on the basis of the above X-ray diffraction patterns. Specifically, within 2theta=20 degrees to 70 degrees of X-ray diffraction patterns, sum of peak intensity ratios Sigma $I_M$ of M-type ferrite phase, sum of peak intensity ratios Sigma $I_S$ of S-type ferrite phase, and sum of peak intensity ratios Sigma $I_W$ of W-type ferrite phase were respectively obtained. Subsequently, the proportion of the sum of peak intensity ratios Sigma $I_M$ or Sigma $I_S$ to the total sum of peak intensity ratios (Sigma $I_M$+Sigma $I_S$+Sigma $I_W$) was obtained. Thus, the peak intensity proportion (Sigma $I_M$)/(Sigma $I_M$+Sigma $I_S$+Sigma $I_W$) was determined as the existence fraction of the M-type ferrite phase (M-type ferrite percentage), while the peak intensity proportion (Sigma $I_S$)/(Sigma $I_M$+Sigma $I_S$+Sigma $I_W$) was determined as the existence fraction of the S-type ferrite phase (S-type ferrite percentage). Those results are also shown in Table 1.

Figure 5:
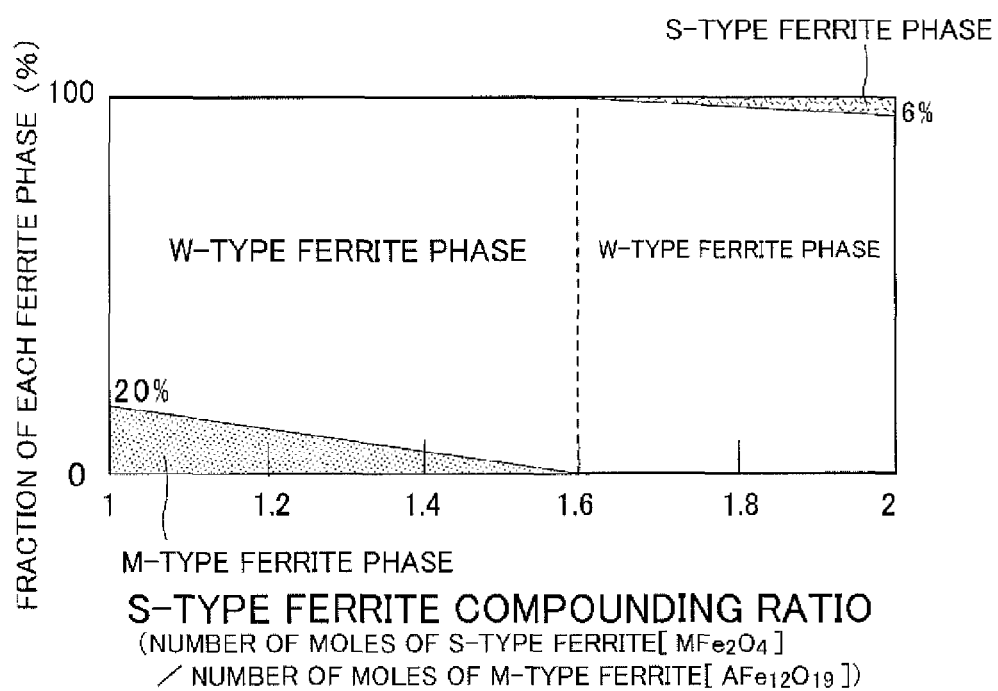
FIG. 5 is an explanatory diagram illustrating a correlation between S-type ferrite compounding ratio and fraction of each ferrite phase in ferrite particle.

On the basis of those results, the existence fraction of W-type ferrite phase (W-type ferrite percentage) is calculated in the same manner, and the correlation between the existence fraction of W-type ferrite phase (W-type ferrite percentage) and the compounding molar ratio of the mixed powder (S-type ferrite compounding ratio) is shown in FIG. 5.

(3) Magnetic Characteristics

The saturation magnetization ($I_S$) of each sample was measured using a vibrating sample magnetometer (VSM). Those saturation magnetizations are also listed in Table 1 as relative values in terms of the reference saturation magnetization in the sample (Sample No. C2) having only M-type ferrite single phase.

<<Evaluation>>

(1) Fracture Surface Structure

As apparent from FIG. 1A and FIG. 1B, in the case of the sample obtained by calcining the compression shape formed compact with orientation in the magnetic field, a fracture surface structure (laminar structure) was observed having such a structure that sheets (W-type ferrite phases) with thickness of about several hundred nanometers were laminated. In addition, the lamination direction of the laminar structure was substantially directed in the direction of the orientating magnetic field applied during the shape forming step.

In contrast, as apparent from FIG. 2, in the case of the sample obtained by calcining the compression shape formed compact without orientation, such a laminar structure and fracture surface structure were not observed.

(2) Compound Phase

As understood from the X-ray diffraction patterns shown in FIG. 3A and FIG. 4, in the case of samples obtained by calcining the shape formed compact in the magnetic field, diffraction peaks representing W-type ferrite phases were steadily observed from (00L) plane within the range of full width at half maximum 2theta=20 degrees to 70 degrees, while other diffraction peaks representing other ferrite phases were still slightly observed depending on the compounding molar ratio of the mixed powder. In addition, the diffraction line intensities from (0010) plane strongly appeared compared to the diffraction line intensities from (116) plane. Those features were not observed in the sample without shape forming in a magnetic field (FIG. 3B) or in the sample before the calcining (FIG. 3C). From those points, it may be understood that, through shape forming mixed powder comprising M-type ferrite particles and S-type ferrite particles in a magnetic field to shape a compact and calcining the compact to synthesize W-type ferrite phases, ferrite particles are stably and efficiently obtained in which those W-type ferrite phases are strongly orientated in the easy direction of magnetization.

Moreover, as understood from FIG. 4, FIG. 5, and Table 1, even if changing within a wide area the compounding molar ratio (molar ratio) of M-type ferrite powder and S-type ferrite powder, the main phases of the finally obtained milled particles (ferrite particles) were W-type ferrite phases. Particularly, it has also been understood that the milled particles are of substantially W-type ferrite single phases when the compounding molar ratio ($ZnFe_2O_4$/SrO $6Fe_2O_3$) is 1.5 to 1.7.

(3) Saturation Magnetization

In the case of the samples obtained through shape forming mixed powder of M-type ferrite powder and S-type ferrite powder in a magnetic field to compress shape formed compacts with orientation and calcining the compacts, any of them had a higher saturation magnetization than that of the case for simple M-type ferrite particles. Particularly, it has become apparent that the samples with the compounding molar ratio of the powders ($ZnFe_2O_4$/SrO $6Fe_2O_3$) of 1.4 to 1.8 are improved by 14% or more for the saturation magnetization compared to the simple M-type ferrite particles.

(4) Mixed-Phase Structure

As understood from Table 1 and FIG. 5, it may also be understood that, by adjusting the compounding molar ratio of M-type ferrite powder and S-type ferrite powder, ferrite particles are obtained which involve a mixed-phase structure (WM mixed-phase structure, WS mixed-phase structure) where W-type ferrite phase and M-type ferrite phase or S-type ferrite phase are mixed. Even such ferrite particles have also become apparent to be improved in their saturation magnetization by 10% or more compared to that of the case for simple M-type ferrite phase. Note that, when the compounding molar ratio was more than 1.6, the existence fraction of unreacted S-type ferrite phase increased, whereas when the compounding ratio was less than 1.6, the existence fraction of unreacted M-type ferrite phase increased. Note also that, even when the compounding molar ratio was two, the S-type ferrite percentage was 6% at the most, while when the compounding molar ratio was one, the M-type ferrite percentage was 20% at the most.

TABLE 1

| Sample No. | Compounding molar ratio of mixed powder (number of moles of $ZnFe_2O_4$/number of moles of $SrFe_{12}O_{19}$) | Magnetic field orientation during compression shape forming | Fraction of each ferrite phase (%) | | | Saturation magnetization (%) |
|---|---|---|---|---|---|---|
| | | | S-type ferrite phase | M-type ferrite phase | W-type ferrite phase | |
| 1 | 2 | Present | 5.7 | 0 | Remnant | 107 |
| 2 | 1.8 | | 0.5~1 | 0 | (Main phase) | 114 |
| 3 | 1.6 | | less than 0.5 | 0 | | 117 |
| 4 | 1.4 | | 0 | 3 | | 114 |
| 5 | 1 | | 0 | 20 | | 111 |
| C1 | 2 | Absent | 18 | 0 | Remnant | 103 |
| C2 | — | | — | 100 (M-type ferrite single phase) | — | 100 |

The invention claimed is:

1. A ferrite particle comprising a laminar structure exhibiting a state where W-type ferrite phases are laminated in an easy direction of magnetization, the W-type ferrite phases comprising a compound expressed by $AM_2Fe_{16}O_{27}$, where A, M, Fe, and O represent a first metal element, a second metal element, iron, and oxygen, respectively.

2. The ferrite particle as set forth in claim 1, wherein the laminar structure is a fracture surface structure to be at least observed at a fracture surface.

3. The ferrite particle as set forth in claim 1, further comprising a WS mixed-phase structure which includes a spinel-type ferrite phase (referred to as "S-type ferrite phase" hereinafter) comprising a compound expressed by $MFe_2O_4$ and in which the W-type ferrite phases and the S-type ferrite phase are mixed.

4. The ferrite particle as set forth in claim 3, wherein the WS mixed-phase structure is such that an S-type ferrite percentage is 6% or less, wherein the S-type ferrite percentage is an existence fraction of the S-type ferrite phase, which is determined by a peak intensity ratio calculated based on X-ray diffraction patterns (2theta=20 degrees to 70 degrees) using a Cu tube as an X-ray source.

5. The ferrite particle as set forth in claim 1, further comprising a WM mixed-phase structure which includes an M-type ferrite phase comprising a compound expressed by $AFe_{12}O_{19}$ and in which the W-type ferrite phases and the M-type ferrite phase are mixed.

6. The ferrite particle as set forth in claim 5, wherein the WM mixed-phase structure is such that an M-type ferrite percentage is 20% or less, wherein the M-type ferrite percentage is an existence fraction of the M-type ferrite phase, which is determined by a peak intensity ratio calculated based on X-ray diffraction patterns (2theta=20 degrees to 70 degrees) using a Cu tube as an X-ray source.

7. The ferrite particle as set forth in claim 1, wherein the first metal element is at least either one of strontium (Sr), barium (Ba), calcium (Ca), or lead (Pb), and
the second metal element is at least either one of Fe, zinc (Zn), copper (Cu), cobalt (Co), manganese (Mn), nickel (Ni), magnesium (Mg), or lithium (Li).

8. A production method for a ferrite particle, comprising:
a shape forming step that shapes a mixed powder in a magnetic field to obtain a compact, the mixed powder comprising M-type ferrite particles comprising a compound expressed by $AFe_{12}O_{19}$ and spinel-type ferrite particles (referred to as "S-type ferrite particles" hereinafter) comprising a compound expressed by $MFe_2O_4$;
a calcination step that calcines the compact to obtain a calcined substance; and
a milling step that mills the calcined substance.

9. The production method for a ferrite particle as set forth in claim 8, wherein the mixed powder is such that an S-type ferrite compounding ratio is two or less, wherein the S-type ferrite compounding ratio is a ratio of number of moles of $MFe_2O_4$ to number of moles of $AFe_{12}O_{19}$.

10. The production method for a ferrite particle as set forth in claim 9, wherein the S-type ferrite compounding ratio is 1.4 to 1.8.

* * * * *